DUPLICATION OF MAGNETIC RECORDINGS

Filed May 17, 1967 3 Sheets-Sheet 1

INVENTORS
AKIO KUMADA
FUMITADA HAYAMA
BY
H. Edward Nestor

INVENTORS
AKIO KUMADA
FUMITADA HAYAMA
BY
H. Edward Mastern

INVENTOR.
AKIO KUMADA
FUMITADA HAYAMA
BY
H. Edward Mostern

United States Patent Office 3,465,105
Patented Sept. 2, 1969

3,465,105
DUPLICATION OF MAGNETIC RECORDINGS

Akio Kumada, Hachioji-shi, Tokyo-to, and Fumitada Hayama, Kodaira-shi, Tokyo-to, Japan, assignors to Kabushiki Kaisha Hitachi Seisakusho, Tokyo-to, Japan, a joint-stock company of Japan Continuation-in-part of application Ser. No. 269,137, Mar. 29, 1963. This application May 17, 1967, Ser. No. 639,196
Claims priority, application Japan, Apr. 2, 1962, 37/12,608
Int. Cl. G11b *5/02*
U.S. Cl. 179—100.2 8 Claims

ABSTRACT OF THE DISCLOSURE

A quick, simple, and easy duplication of magnetic recording signals can be carried out with excellent frequency characteristics and high fidelity by causing an unrecorded magnetic record member (blank) coated on its surface with magnetic powder in spherical shape to closely contact the surface of a recorded magnetic record member (mother) coated with magnetic powder, heating the blank member to decrease coercive force of the magnetic powder coated thereon so as to duplicate the recording signals of the mother member, and, if necessary in the course of duplication, subjecting a mother member to frequency-correction, or recording on the blank member beforehand a direct current signal, or a signal having a frequency higher or lower than the frequency band to be recorded.

This invention is a continuation-in-part application of our copending application Ser. No. 269,137, filed Mar. 29, 1963, titled "Duplication of Magnetic Recordings," now abandoned.

This invention relates to a method for making duplicate copies on an unrecorded magnetic record member (hereinafter referred to as "blank") of signals which have been previously recorded magnetically on a record member (hereinafter referred to as "mother"). Heretofore, duplicate magnetic records have been produced by moving a master record between the poles of a conventional playback head whose output is connected to the input of an amplifier, while the blank record is being moved between the poles of a conventional recording head which is connected to the output of said amplifier. Accordingly, a separate amplifier and recording head are required for each blank record, when it is desired to duplicate the magnetic trace of the master record. Furthermore, since the output of the playback head is connected to the input of an amplifier, the master record must be moved between the poles of the playback head at the usual operating speed for reproduction of the signals which will occur in the amplifier system. It is therefore evident that duplicating systems used at present have the disadvantage of requiring separate amplifiers and recording heads for each duplicate record to be produced. Consequently, cumbersome and expensive equipment becomes necessary; particularly, when industrialized mass-production system is intended, and, in addition, the speed, at which duplicate records may be produced, is limited by the conventional operating speed for reproduction of the signals recorded on the master record.

On account of this, it has been proposed, particularly in U.S. Patent No. 2,738,383, to accomplish duplication of magnetic recordings by superposing a blank member on a mother member and then imparting agitation to the superposed members in an idealizing field. As the method for creating the idealizing field, the prior art proposes to impart an alternating magnetic field, thereafter reducing the magnitude of the field gradually until it becomes zero. For the other possible means, the prior art discloses the method of introducing strains into the crystal lattice of the magnetic recording medium by mechanical vibrations, X-ray radiation, electrostatic fields, spark discharges, and thermal strains. However, these proposed methods mostly require very complicated apparatus, the operation of which being not so easy. Moreover, in order to reduce into practice such methods, it is necessary to utilize, as the blank member, the magnetic material whose coercive force is smaller than that of the magnetic material to be used for the mother member. In this case, if the difference in coercive force of both magnetic materials is not so appreciable, the signal recorded on the mother member becomes attenuated to a considerable extent, when the duplication has been repeated over several hundred times, and, moreover, strains are caused in the recorded contents with the result that the duplicated recording signal hardly serves for practical purposes as it is, where high fidelity recording, such as musical performance, etc., is essential, and further that duplication to a blank member coated with magnetic material of high coercive force is difficult. Since, however, this method is capable of using ordinary needle-shaped magnetic powder, it can be adopted for low fidelity duplication of magnetic recordings, in which any strain to the recording signal does not pose a problem.

The present invention has noticed the fact that a device for thermal duplication is simple in its construction and easy in operation, based on which it has added some improvements in this kind of duplication method to eliminate the drawbacks inherent in the conventional art, the improvements being such that a blank member utilizing spherical magnetic material closely adheres to a mother member without relative slippage, then it is heated to a constant temperature below the Curie temperature of the magnetic material, and, after lapse of certain time of heating, it is separated from the mother member. In other words, the method is to utilize decrease in coercive force of the spherical magnetic material due to heating below the Curie temperature thereof.

It is therefore the principal object of the present invention to provide a quick, simple, easy, and effective method of duplication of magnetic recordings, which is of high fidelity with respect to the original signal.

It is another object of the present invention to provide a method which is capable of carrying out thermal duplication of magnetic recordings, even when the coercive force of the magnetic material to be used for the blank member is equal to or higher than that of the magnetic material to be used for the mother member.

It is another object of the present invention to provide a method which enables duplication of a number of blank members without attentuating the recorded signals of the mother member.

It is still another object of the present invention to provide a method which enables duplication of magnetic recordings with excellent frequency characteristics, high fidelity, and least amplitude strains.

These objects and other objects of this invention will be best understood from the following description of the general idea as well as the specific preferred embodiments of the present invention taken in conjunction with the accompanying drawings.

In the drawings, FIG. 1 is a graphical representation of characteristic curves showing relationship between the temperature and coercive force of the magnetic material to be used for the duplication of magnetic recordings according to the present invention;

Figure 5:
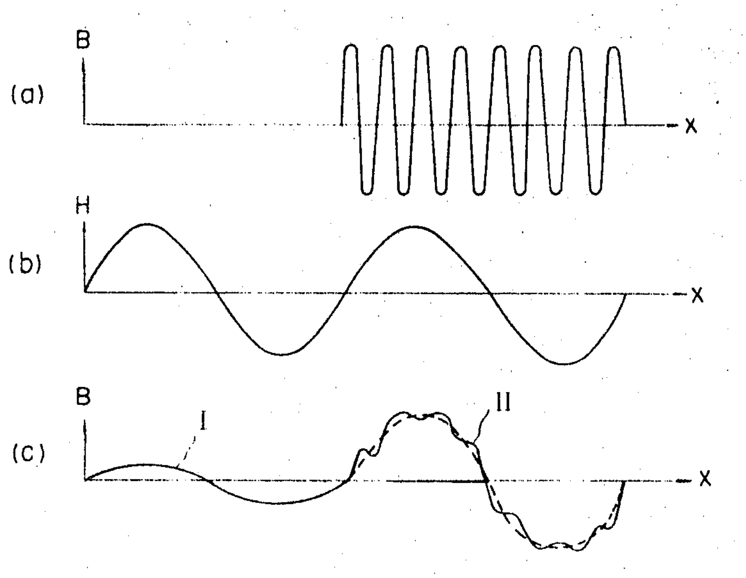
Figures 6, 7:
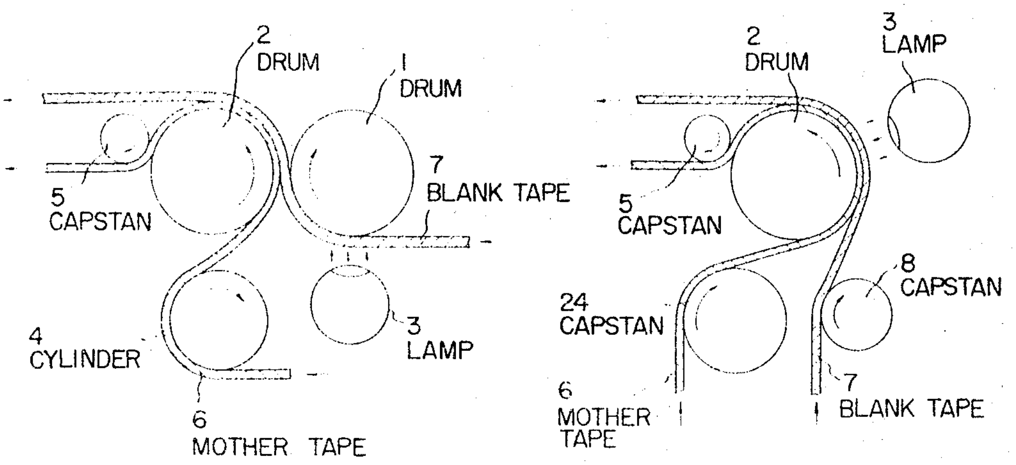
Figure 8:
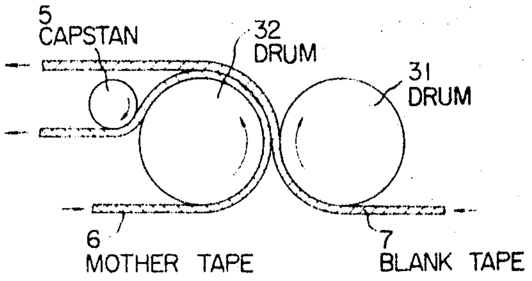
Figure 9:
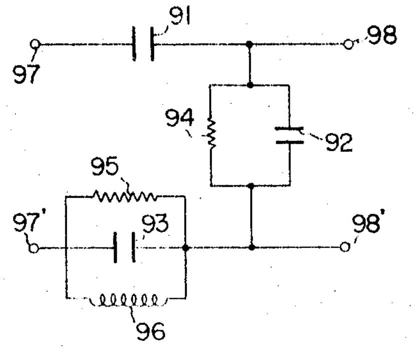
Figure 10:
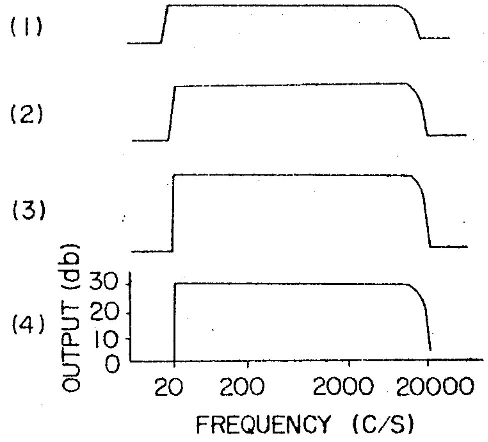

FIGS. 5(*a*), 5(*b*), and 5(*c*) are characteristic curves respectively showing the effects of duplication when a blank member, in which a high freqency signal has previously been recorded, is used;

FIG. 6 is an elevational sectional view of a main part of a device to be used for duplication of magnetic recordings according to the present invention;

FIGS. 7 and 8 are other embodiments of the elevational view of main parts of devices to be used for this invention;

FIG. 9 is an embodiment of a frequency correcting circuit, in case a mother member which is subjected to frequency-correction is used; and FIGS. 10(*a*), 10(*b*), 10(*c*), and 10(*d*) are respectively characteristic curves showing relationship between frequency and output in case a blank member, in which high frequency signal has previously been recorded, is used.

As described in the foregoing, the present invention is to utilize the phenomenon that the coercive force of the magnetic material is affected by the temperature variation. In order, therefore, to attain this object in a most effective manner, it is proposed to use magnetic powder of spherical shape whose coercive force remarkably varies in accordance with temperature variation within a certain range. That is, this spherical magnetic powder decreases in its coercive force when the temperature rises. The grain size of the magnetic material is preferably less than a few microns, particularly in the range of 200 A. to 1,000 A. The magnetic material to be used is $\gamma\text{-}Fe_2O_3$, $$CrO_2\cdot\gamma Fe_2O_3$$

or $\gamma\text{-}Fe_2O_3$ together with 0.01–30% of $CrO_2$, or at least one of Co, Zn, Mn, etc. Here, the term "grain" designates single crystals of the abovementioned magnetic powder or its aggregate which includes cubes, ellipsoids of revolution, and polyhedrons, and whose ratio of long axis to short axis is smaller than 2:1.

When the surface of a blank member coated with the abovementioned spherical magnetic powder closely adheres to the magnetic coating surface of a mother member in a heated state, the contents recorded in the mother member can be easily duplicated on the blank member, since the coercive force of the blank has decreased due to the heating. At this time, when the mother member is subjected to cooling in advance, demagnetization of the mother member practically does not take place at all. It is also possible that the desired duplication can be carried out successfully by heating the blank member after the magnetic coating surface thereof has closely adhered to the magnetic coating surface of the mother member, in which case the cooling of the mother member mold, of course, furnishes an effective result.

Next, mention is made of coercive force, and heating temperature of the mother and blank members. The average value H of the magnetic field which is created by the signal recorded on the mother member is usually represented by the following equation:

$$H=4\pi I_0\frac{\sin h\frac{kd}{2}}{\cos h\frac{kd}{2}+\mu\sin h\frac{kd}{2}}e^{-k\left(y-\frac{d}{2}\right)}$$

(where: $I_0$ is the magnetization corresponding to the signal recorded in the mother member; *d* is thickness of the magnetic coating on the recording member; *y* is length taken in perpendicular direction with respect to the surface of the recording member; $\mu$ is magnetic permeability; and *k* corresponds to $2\pi/\lambda$ ($\lambda$=wave length)). Accordingly, for example, when a sinusodial wave of 1 kc./s. of a standard level (which is lower by 13 db than maximum amplitude whose amplitude strain is within 3%) is recorded at the recording speed of 19 cm./sec., the magnitude of the magnetic field $H_{eff}$ which has been been averaged from the magnetic field which attenuates in accordance with the thickness of the magnetic coating of the blank member, in case the duplication is done by closely adhering the blank member to the mother, becomes 60 oersteds. This signifies that the coercive force of the magnetic material used for the blank is desirably less than 60 oersteds at the temperature of duplication. Furthermore, the temperature coefficient $dh/dt$ of the coercive force in the vicinity of the duplication temperature should preferably be as small as possible. The temperature at duplication differs depending on the kind of the base material for the recording member, configuration of such member, etc. In the case of a recording member using Mylar base material, the temperature ranges from 120–130° C., and, in case of a recording member in sheet form, it is 150° C., and when its configuration is magnetic circular disc, the temperature is from 150–200° C. The coercive force of the blank member at a room temperature will be sufficient at 200 oersteds and above for effectively preventing the transfer effect. In order, however, to enable the blank member to be useful also as an ordinary recording medium, the coercive force is preferably at a constant value of 250 oersteds at a practical temperature range of −10–60° C.

Figure 1:
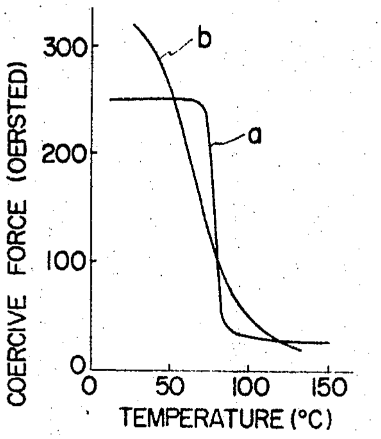
Figure 3:
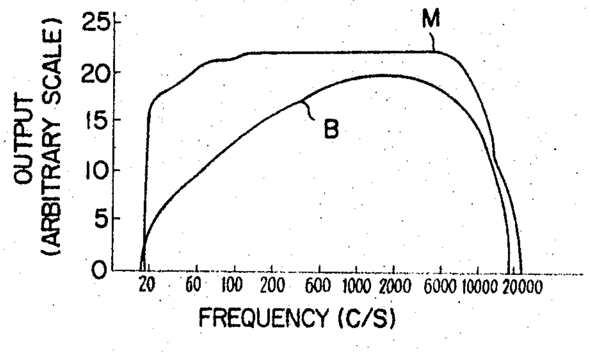
FIG. 3 is a graph showing frequency characteristics curves of one embodiment of the present invention, wherein the duplication is carried out with a mother member which has not been subjected to frequency-correction.

As is apparent from the foregoing description, the variation in coercive force of the magnetic material for the blank member in accordance with temperature change requires a characteristic as shown by a curve *a* of FIG. 1 in the case of a magnetic tape, and it can be of large temperature coefficient at the room temperature as that shown by the curve *b* of FIG. 1. This is based on the configurative anisotropy of the magnetic material. Generally, the recording medium (or member) is so produced that its coercive force may become 200–300 oersteds at the room temperature. This has relationship with crystal anisotropy of the magnetic material (due to the kinds of element or other elements to be added thereto, as well as symmetricity of the crystals as the compounds of these elements), configurative anisotropy thereof, a shape of crystals as an aggregate body of molecules of the magnetic material, or the external appearance of an aggregate body (a polycrystalline body or granules which are generally called magnetic powder) of these elements or compounds having strong magnetic short range interaction. Of these the coercive force due to the configurative anisotropy possesses a temperature range within which it is remarkably decreased depending on temperature by changing the ratio between the surface area and the volume of the magnetic powder. However, the signal contents recorded in the blank member by close adherence of the blank member to the mother member are not always satisfactory in respect to frequency characteristics and fidelity. That is, as shown by the curve M in FIG. 3, the frequency characteristic curve of a blank member obtained by heat-duplication from a mother member, on which a signal of frequencies ranging from 30 c./s. to 20 kc./s. is recorded at a constant amplitude, is poor in its effect of duplication at both high and low sound regions; particularly, the sound in the vicinity of frequency being 1–2 kc./s. is stressed. Accordingly, when such high and low sounds are to be duplicated with high fidelity, the sound in the vicinity of 1–2 kc./s. becomes too great and inevitably causes the so-called "breakage." On the other hand, when it is tried to duplicate the sound in the vicinity of 1–2 kc./s. with as high fidelity as possible, sounds at both low and high regions become small, wherein the frequency distortion brings about the amplitude distortion. This is because the duplication of magnetic recordings of this kind makes use of a magnetic field to be produced by the magnetic field of the mother member, wherein the field strength H is represented by the foregoing equation, according to which the local variations in the magnetization in the mother member become remarkable as the recording wave length in the low sound region becomes short, and the field strength appearing on the surface of the mother member becomes strong, and, further, when the wave length is shorter, the magnetic field on the surface of the mother member is strong, but it becomes attenuated exponentially and functionally as it departs from the surface thereof, so that, although the magnetic field to affect the surface of the blank member which is superposed on the mother member is strong, the field does not reach deep within the member and the magnetization remains on the surface portion only, hence the quantity of magnetization becomes smaller as a whole.

As a solution to this point, the present invention employs a method, wherein a frequency-correction is given beforehand to a mother member in such a manner that the frequency characteristics of a blank member be maintained constant.

Furthermore, in this kind of duplication in magnetic recordings, the ratio of input to output is small within the range, wherein the input signal is small, and the duplication effect is not satisfactory unless the input becomes increased to some extent. Moreover, if the recording is carried out with a large amplitude so as to increase the input, strains are caused to break the sound with the result that tone of the sound deteriorates considerably.

The present invention proposes, as a solution thereto, a method wherein a frequency signal which is sufficiently higher or lower than direct current or the recording wave length of a signal recorded on the mother member is previously imparted to the blank member. For example, when a blank member which is given a sufficiently high frequency signal is heated, the recorded high frequency signal becomes easily affected by external disturbances due to temperature variation to a great extent with the consequence that magnitude of magnetization and coercive force are varied, and the magnetization of the blank member becomes extremely unstable. On account of this, when the magnetic field of the mother member acts on the blank member, it becomes possible to easily change the state of magnetization in accordance with the magnetic field of the mother member. FIGS. 5(*a*), 5(*b*), and 5(*c*) schematically show the effects of duplication when such method is utilized, in which the abscissa is for a distance X and the ordinate is for magnetic flux density B or the field strength H. In FIG. 5(*a*), a high frequency signal is recorded on the right half of a blank tape. In FIG. 5(*b*), a magnetic field on the surface of a mother tape where an audio-signal is recorded is shown. In FIG. 5(*c*), there is shown a state of magnetization of a blank tape which has been subjected to duplication by close adherence of the blank tape heated to high temperature to the mother tape, in which the curve I shows a case, wherein a blank member is not recorded beforehand with high frequency signal; and the curve II shows a case, wherein a blank member is recorded beforehand with high frequency signal. As is apparent from the drawing, where the high frequency signal is recorded beforehand, a remarkable improvement in the duplication effect can be recognized because the high frequency signal is subjected to modulation due to the magnetic field produced by the recorded signal of the mother member. The signal modulated by high frequency is cooled and then shifts to the state as shown by a dotted line as time goes by, so as to become stabilized.

Figure 2:
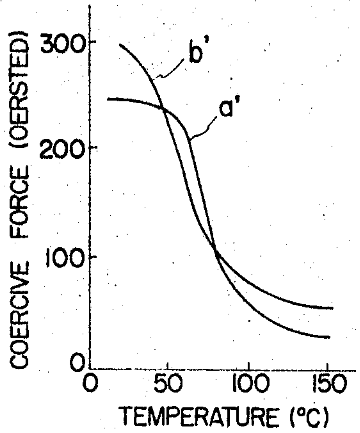
FIG. 2 is another set of characteristics curves showing relationship between the temperature and coercive force of the magnetic material to be used for the duplication of magnetic recordings according to the present invention.

FIG. 6 shows one example of the main part of a device to be used for duplication of magnetic recordings according to the present invention. This device is constructed by drums 1 and 2 made of heat-resistant material such as Teflon, etc., an infrared ray generating lamp 3, a cylinder 4 made of material capable of being cooled such as aluminum, a capstan 5, a mother tape 6, and a blank tape 7. The blank tape is coated with granular $\gamma$-$Fe_2O_3$ magnetic powder plus copper at a rate of 3% which is granulated to an average gain diameter of 0.07 micron. The thickness of the coating is 10 microns at the density of 60%. The temperature characteristics of the coercive force are shown by the curve *b'* in FIG. 2. Duplication by this device is performed by first heating the blank tape by the infrared ray generating lamp 3, thereafter causing it to closely adhere to the mother tape 6 which has been cooled by the cylinder 4, transferring the recorded contents in the mother tape 6 to the blank 7 on the drum 2, and finally separating the mother and blank by means of the capstan 5. In this example, the tape to be used is such one that is coated with magnetic powder on the surface of the base sheet. However, it is of course possible to use a tape, in which the magnetic material is dispersed in the base material as the integral part. (In the present specification, the term "coating" includes such case.)

Also, in this example, a case wherein the magnetic powder is $\gamma$-$Fe_2O_3$ plus Co, but it is, of course, possible to utilize $\gamma$-$Fe_2O_3$ without copper being added. Further, the magnetic material $\gamma$-$Fe_2O_3$ plus $CrO_2$ or any one of Zn and Mn can be used (in this case, the additive component is not necessarily in a solid-solution state). The curve *a'* in FIG. 2 indicates the temperature characteristics of the coercive force in case of $CrO_2 \cdot Fe_2O_3$. It is to be noted that variation in coercive force of these magnetic materials with respect to temperature is remarkable, when the grain diameter of the powder is small (less than a few microns), particularly, the grain diameter in the range of 200 A. to 1,000 A. is the most suitable. The effect of duplication will be much more remarkable when the grain size is uniform throughout the material.

As is apparent from the foregoing explanation, the magnetic powder for the present invention possesses remarkable variation in coercive force due to temperature change in comparison with the conventional needle-shaped magnetic powder which does not change its coercive force in accordance with the room temperature and the duplication temperature. Furthermore, the spherical magnetic powder is superior in its duplication effect to the needle-shaped magnetic powder by 40 db. Also, by proper selection of grain size, it is possible to obtain the magnetic powder having small temperature coefficient of coercive force at the duplication temperature, so that stable duplication with high efficiency is possible.

FIG. 7 shows another embodiment of the duplicating device which is constructed with a drum 2 made of heat-resisting material such as Teflon, etc., an infrared ray generating lamp 3, capstans 5, 8, and 24, a mother tape 6, and a blank tape 7. More effective result can be obtained, if the capstan is constructed with a material capable of being cooled such as aluminum so that the mother tape may be cooled beforehand. In this case, the blank is heated after it is closely joined to the mother tape.

FIG. 8 indicates another embodiment of the device to be used for the present invention which is constructed by a drum 31 made of heatable material such as aluminum, etc., another drum 32 made of material capable of being cooled such as aluminum, etc., a capstan 5, a mother tape 6, and a blank tape 7. In this case, it is possible to carry out simultaneously the superposition of the mother and blank as well as cooling of the mother tape, if such is required.

In the following, mention is made as to improvements in frequency characteristics. The mother tape is prepared usually in plurality by recording an original sound through a frequency correction circuit. When the duplication is conducted by using the mother tape thus prepared in accordance with the process as described above through the devices of FIGS. 6, 7, and 8, no attenuation of recorded signals on the mother tape could be seen, even when the duplication is carried out on blank tape of, e.g., ten thousand sheets. In this case, it is also possible that a tape, in which an original sound is recorded, as it is, is made a grand-mother tape, whose output is frequency-corrected to be made a mother tape.

FIG. 9 shows one embodiment of the frequency-correction circuit which is constructed by a single circuit component including transistors. The reference numeral 91 is a capacitor of 100,000 pf., 92 is a capacitor of 50 pf., 93 is a capacitor of 1,000 pf., 94 is a resistor of 30KΩ, 95 is a resistor of 300KΩ, 96 is a coil of 30 mh., 97 and 97' are input terminals, and 98 and 98' are output terminals.

Figure 4:
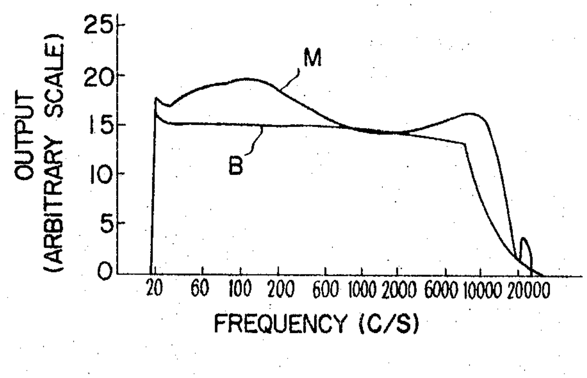
FIG. 4 is a graph showing frequency characteristics curves of another embodiment of the present invention, wherein the duplication is carried out with a mother member which has been subjected to frequency-correction.

FIG. 4 shows frequency characteristics of the mother and blank in case the abovementioned frequency-correction circuit is used. In this graphical representation, the curve M is that of the mother tape subjected to the frequency-correction, the curve B is that of the blank tape obtained from the frequency-corrected mother tape. The recording speed of the mother in this case was 19 cm./sec. As is apparent from the drawing, the curve B is perfectly flat up to the frequency of 1 kc./sec. and is substantially flat between 1 kc./sec. and 7 kc./sec. with a slight variation within 1 db. It will be clear from the comparison of FIG. 3 that the frequency characteristics of the blank tape has been remarkably improved, which enables the duplication very close to the original sound. Thus, the distortion in the recording can be perfectly removed by the frequency-correction, and the high fidelity duplication of the magnetic recordings can be performed within a short time and in an easy manner by means of the extremely simple device.

FIGS. 10(*a*), 10(*b*), 10(*c*), and 10(*d*) show respectively the duplication efficiency in case of high frequency signal being imparted to the blank tape beforehand, wherein the blank tape is heated to 120° C. after high frequency signal of 15 kc./sec. is recorded thereon at 10 db., and then it is closely joined to the mother tape, on which an audio signal is recorded. In the drawing, the abscissa is for frequency and the ordinate for output, and FIGS. 10(*a*), 10(*b*), 10(*c*) and 10(*d*), respectively, indicate cases where no high frequency signal is imparted, high frequency signal of 0 db (standard level) is imparted, 14 db of that is imparted, and 20 db of the same is imparted. The duplicated magnetic recording obtained by this method is not distinguishable from its original sound, even by a person who is bestowed with an extremely high discriminating capability of tone quality, and its duplicating efficiency is improved twice as much as the conventional case. When the amplitude of the high frequency signal previously recorded on the blank tape is increased, the reproducing output increases as shown in FIGS. 10(*a*), 10(*b*), 10(*c*), and 10(*d*), although it becomes saturated at about 10 db level. This signifies that high frequency signal will be sufficient if it is imparted at the rate of 10 db or so.

The foregoing description is for the case, wherein the blank tape is magnetized in advance with high frequency signal. However, it is also possible that the blank can be magnetized with a direct current or low frequency signal. However, in the case of audio recording, when audible frequency (30–30,000 c./s.) is used as the signal to be recorded beforehand, such audible frequency signal causes unavoidable interference with the duplication signal, so that the frequency range of 30–15,000 c./s. cannot be utilized. In other words, it is necessary that a sufficiently higher (e.g. more than 10 kc./s.) or lower (e.g. less than 50 c./s.) frequency signal than the frequency band of the signal recorded on the mother tape should be used.

By the method of the present invention, the duplication efficiency increases considerably and high fidelity duplication is made possible. In the known method of using the idealizing field, linearity of input to output becomes satisfactory, but no improvement in the duplication efficiency can be expected. Contrary to this, the present invention is extremely remarkable not only in its linearity but also in its improved efficiency.

The method of duplication of magnetic recordings according to the present invention is applicable to not only recording medium in a tape-form, but also to those media of a disc-form, a cylindrical form, and a sheet-form. In the case of discs and the like, in which guide grooves for a magnetic head are provided by press-machining, duplication is also made possible simultaneously at the time of forming such guide grooves. This invention is also applicable to duplication of signals recorded or recording media such as audio-recording, video-recording and other recording media of magnetic material.

As mentioned in the foregoing, the present invention makes it possible to perform duplication of magnetic recordings in a quick, simple, and easy manner, wherein the magnetic material having coercive force which is equal to or more than that of the magnetic material used for the mother tape can be used for the blank tape. Thus, the coercive force of the mother tape will not attenuate, so that multiple duplication of the recorded signal as well as magnetic duplication of high fidelity are made possible, which is highly effective from the practical point of view.

Although this invention has been described with respect to preferred embodiments thereof, it is not to be so limited as changes and modifications may be made therein which are within the full intended scope of the invention as defined by the appended claims.

What we claim is:

1. In a method for duplicating magnetic recorded signals, the steps comprising:

(a) closely adhering an unrecorded magnetic record blank member to a recorded magnetic mother member in which signals to be duplicated are recorded, said blank member employing spherical magnetic powder of grain size greater than 200A and smaller than a few microns in diameter, said powder having a relatively high and substantially constant coercive force within a temperature range between −10 and +60° C. but presenting an abrupt decrease in the coercive force at a relatively high temperature exceeding said temperature range though below the Curie point thereof;

(b) heating at least said blank member at said relatively high temperature but below the Curie point thereof during its close adherence to the mother member;

(c) reducing the temperature of said blank member to said temperature range while being kept in the adhered conditions to said mother member; and (d) separating said blank and mother members from each other, thereby obtaining stabilized signal duplication with high fidelity and sensitivity in said blank member without reducing the magnetic intensity of the signals recorded in the mother member.

2. The method as defined in claim 1, wherein the heating of said blank member precedes the close adherence of said blank member to said mother member.

3. The method as defined in claim 1, wherein said mother member is cooled while closely adhering to said blank member.

4. The method as defined in claim 1, wherein said mother member is recorded with frequency compensated signals the high and low frequency components of which are relatively stressed with respect to the middle frequency component thereof.

5. The method as defined in claim 1, wherein said blank member is pre-recorded with an alternating frequency signal of less than 50 cycles per second before its adherence to the mother member.

6. The method as defined in claim 1, wherein said blank member is pre-recorded with an alternating frequency signal of more than 10 kilocycles per second before its close adherence to said mother member.

7. The method as defined in claim 1, wherein said blank member is pre-recorded with a direct current signal before its close adherence to said mother member.

8. The method as defined in claim 1, wherein said spherical magnetic powder material is selected from the group consisting of $\gamma\text{-}Fe_2O_3$, $CrO_2$, and $\gamma\text{-}Fe_2O_3$ with at least one from the group consisting of $CrO_2$, Co, Zn and Mn added, the concentration of the added material being from 0.01 to 30.00 percent.

References Cited

UNITED STATES PATENTS

| | | | |
|---|---|---|---|
| 2,915,594 | 12/1959 | Burns et al. | 179—100.2 |
| 2,738,383 | 3/1956 | Herr et al. | 179—100.2 |
| 3,364,496 | 1/1968 | Greiner et al. | 179—100.2 |

OTHER REFERENCES

The physics of Magnetic Recording, by C. D. Mee, © 1964, North-Holland Pub. Co., Amsterdam, pages 176–181.

BERNARD KONICK, Primary Examiner

J. R. GOUDEAU, Assistant Examiner

U.S. Cl. X.R.

346—74